(12) United States Patent
Wilczek et al.

(10) Patent No.: US 10,949,229 B1
(45) Date of Patent: Mar. 16, 2021

(54) TRACKING INTERACTIONS WITH A SOFTWARE PLATFORM AND IDENTIFYING UNDERUTILIZATION OF SOFTWARE PLATFORM FEATURES IN A SPECIFIC DEPLOYMENT

(71) Applicant: Coupa Software Incorporated, San Mateo, CA (US)

(72) Inventors: Donna Wilczek, Sonoma, CA (US); Parand Tony Darugar, San Diego, CA (US); David Williams, San Mateo, CA (US); Vincent Toesca, San Mateo, CA (US)

(73) Assignee: Coupa Software Incorporated, San Mateo, CA (US)

( * ) Notice: Subject to any disclaimer, the term of this patent is extended or adjusted under 35 U.S.C. 154(b) by 0 days.

(21) Appl. No.: 16/537,431

(22) Filed: Aug. 9, 2019

Related U.S. Application Data

(60) Provisional application No. 62/717,446, filed on Aug. 10, 2018.

(51) Int. Cl.
  *G06F 3/048* (2013.01)
  *G06F 9/451* (2018.01)
  *G06T 11/20* (2006.01)

(52) U.S. Cl.
  CPC ............ *G06F 9/453* (2018.02); *G06T 11/206* (2013.01)

(58) Field of Classification Search
  CPC .......... G06F 17/30; G06F 17/00; G06F 9/453; H04L 67/22; H04L 67/12; G06Q 10/103;
  (Continued)

(56) References Cited

U.S. PATENT DOCUMENTS

| 8,660,983 B2 * | 2/2014 | Aggarwal | G06Q 10/06 707/602 |
| 2008/0312988 A1 * | 12/2008 | Trapp | G06Q 10/06395 705/7.29 |

(Continued)

*Primary Examiner* — Rashawn N Tillery
(74) *Attorney, Agent, or Firm* — Baker Botts L.L.P.

(57) ABSTRACT

Techniques for tracking software platform utilization by a plurality of entities are described herein. In an embodiment, a management computer system stores first entity data defining a first entity and associating the first entity with a plurality of first accounts, the first entity having access to the management computer system programmed which provides options for performing a plurality of tasks. The management computer system tracks a first plurality of interactions with the management computer system that are performed by each of the plurality of first accounts. The management computer system stores first interaction data defining one or more aspects of interaction with the management computer system that are performed by each of the plurality of first accounts. The management computer system stores second entity data defining a plurality of second entities and associating each of the plurality of second entities with a plurality of second accounts. The management computer system tracks a second plurality of interactions with the management computer system that are performed by each of the plurality of second accounts. The management computer system stores second interaction data defining the one or more aspects of interaction with the management computer system performed by each of the plurality of second accounts. The management computer system computes one or more first metrics for the first entity based, at least in part, on the tracked first interaction data. The management computer system computes one or more second metrics for the plurality of second entities based, at least in part, on the tracked second interaction data. The management computer system generates a display comprising a comparison (Continued)

between the one or more first metrics for the first entity and the one or more second metrics for the plurality of second entities.

14 Claims, 4 Drawing Sheets

(58) Field of Classification Search
CPC . G06Q 10/06; G06Q 10/06395; G06T 11/206
See application file for complete search history.

(56) References Cited

U.S. PATENT DOCUMENTS

| | | | |
|---|---|---|---|
| 2016/0267408 A1* | 9/2016 | Singh | H04L 67/12 |
| 2017/0004448 A1* | 1/2017 | Randles | G06Q 10/103 |
| 2018/0096378 A1* | 4/2018 | Moniz | H04L 67/22 |
| 2020/0250472 A1* | 8/2020 | Abhyankar | G06K 9/6253 |

* cited by examiner

US 10,949,229 B1

TRACKING INTERACTIONS WITH A SOFTWARE PLATFORM AND IDENTIFYING UNDERUTILIZATION OF SOFTWARE PLATFORM FEATURES IN A SPECIFIC DEPLOYMENT

BENEFIT CLAIM

This application claims the benefit under 35 U.S.C. § 119(e) of provisional application 62/717,446, filed Aug. 10, 2018, the entire contents of which are hereby incorporated by reference for all purposes as if fully set forth herein.

FIELD OF THE DISCLOSURE

The present disclosure is in the technical field of configurable software platforms and platform interfaces. The disclosure also is in the technical field of transaction tracking between computing devices, preprocessing of transaction data, and generation of displays identifying metrics related to interactions between computing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Configurable software platforms allow companies to focus on business strategies without requiring the companies to generate their own software platforms. As the needs of different types of customers may vary widely, modern software platforms are often built to be configurable to a wide variety of use cases. Software platforms that allow users to define their own variables, rules, operations, jobs, and reports are useful for providing flexibility in deployment. This allows two companies with completely different needs to use the same software, and customize projects to their own specific use cases.

Often with deployments of software packages, specific features of the software packages tend to be overlooked by users associated with a single entity. While configurable software packages can be extremely useful for entities with a large number of users, it is difficult to determine whether the software package is being properly utilized as information as to which features are utilized by the users associated with an entity are not readily available.

Additionally, even if a system administrator is able to identify which features of a software platform are being used and to what extent, there is no way for the system administrator to determine whether the use of the features by the users associated with the entity is abnormal as a determination of abnormality would require knowledge of the use of features by other entities. Even if such information were available, due to different purposes and business requirements, feature use may only be comparable across businesses of similar size or businesses that perform similar functions.

Thus, there is a need for a system which can track use of features of a software platform by different entities. Additionally, there is a need for a system which can identify entities for comparison and generate and display comparison metrics for a particular entity.

SUMMARY

The appended claims may serve to summarize the disclosure.

DETAILED DESCRIPTION

Figure 1:
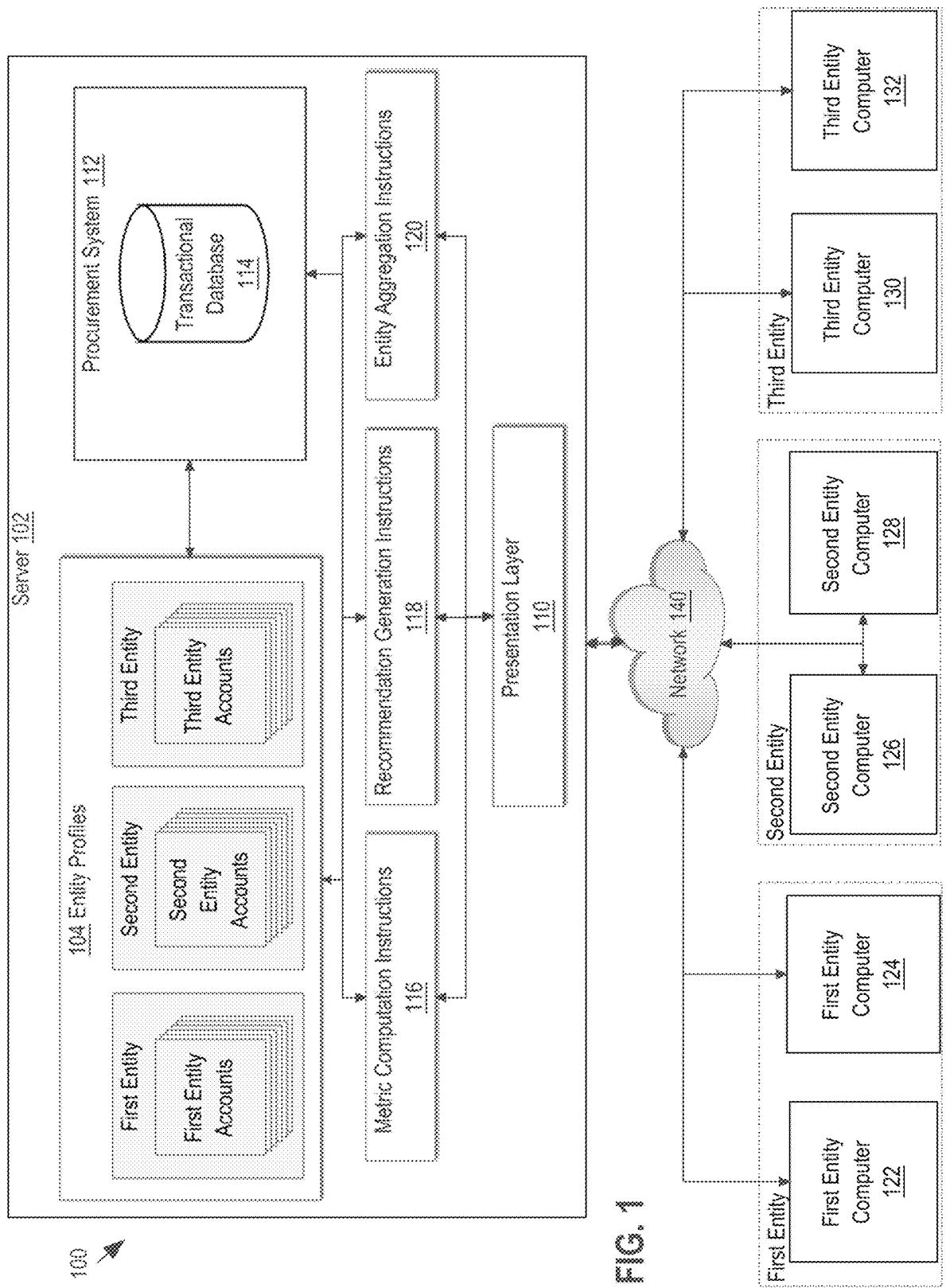
FIG. 1 is a block diagram of an example computer network system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections below according to the following outline:

General Overview
    Structural Overview
    Functional Overview
    Tracked Interactions and Generated Metrics
    Recommendation Actions
    Visual Comparisons
    Benefits of Certain Embodiments
    Implementation Example—Hardware Overview

General Overview

Techniques for tracking interactions between computing devices associated with an entity and a software platform are described herein. In an embodiment, a server computer stores profile data for a plurality of users, the profile data defining an entity to which the users belong. For each entity of a plurality of entities, the server computer tracks interactions with the server computer by client computing devices that interact with the server computer on behalf of the entity. The server computer preprocesses interaction data for each entity. For a particular entity, the server computer identifies a plurality of entities for comparison and generates an aggregated metric for the plurality of entities. The server computer then causes display of a comparison between metrics identifying the interactions of the particular entity with the software platform and metrics identifying the interactions of the plurality of entities with the software platform.

In an embodiment, a method comprises storing first entity data defining a first entity and associating the first entity with a plurality of first accounts, the first entity having access to a management computer system programmed with options for performing a plurality of tasks; tracking a first plurality of interactions with the management computer system that are performed by each of the plurality of first accounts; storing first interaction data defining one or more aspects of interaction with the management computer system that are performed by each of the plurality of first accounts; storing second entity data defining a plurality of second entities and associating each of the plurality of second entities with a plurality of second accounts; tracking a second plurality of interactions with the management computer system that are performed by each of the plurality of second accounts; storing second interaction data defining the one or more aspects of interaction with the management computer system performed by each of the plurality of second accounts; computing one or more first metrics for the first entity based, at least in part, on the tracked first interaction data; computing one or more second metrics for the plurality of second entities based, at least in part, on the tracked second interaction data; generating a display comprising a comparison between the one or more first metrics for the first entity and the one or more second metrics for the plurality of second entities.

In an embodiment, the method further comprises determining that the one or more first metrics for the first entity is lower than the one or more second metrics for the plurality of second entities and, in response, generating a recommendation for one or more actions to be performed through the management computer system; causing displaying, through the management computer system, on a computing device associated with the first entity, the recommendation for the one or more actions to be performed through the management computer system. In an embodiment, the method further comprises causing displaying with the recommendation for the one or more actions, a selectable link for performing the one or more actions; receiving a selection of the selectable link; in response to receiving the selection, navigating to a page of the software platform comprise options for performing the one or more actions.

In an embodiment, the method further comprises receiving a request from a client computing device associated with the first entity for a dynamic display comprising the comparison between the one or more first metrics for the first entity and the one or more second metrics for the plurality of second entities; in response to receiving the request, performing the computing of the one or more second metrics for the plurality of second entities.

In an embodiment, the method further comprises storing third entity data defining a plurality of third entities and associating each of the plurality of third entities with a plurality of third accounts, wherein the plurality of second entities is a strict subset of the plurality of third entities; tracking a third plurality of interactions with the management computer system that are performed by each of the plurality of third accounts; storing third interaction data defining the one or more aspects of interaction with the management computer system performed by each of a plurality of third accounts; in response to receiving the request, determining that the plurality of second entities perform comparable transactions to the first entity and selecting the plurality of second entities from the plurality of third entities for comparing to the first entity.

In an embodiment, computing the one or more second metrics comprises computing a total transaction metric for the plurality of second entities; for each of the plurality of second entities, identifying a percentage of total transaction metric which corresponds to the entity; generating, for each of the plurality of second entities, a weighted metric based, at least in part, on tracked transaction data for the entity and the percentage of the total transaction metric which corresponds to the entity; computing the one or more second metrics as a function of the weighted metrics for each of the plurality of second entities.

In an embodiment, the display comprises superimposed bar graphs, a first bar graph identifying the one or more first metrics for the first entity and a second bar graph identifying one or more second metrics for the second entity.

In an embodiment, the method further comprises storing third entity data defining a plurality of third entities and associating each of the plurality of third entities with a plurality of third accounts, wherein the plurality of second entities is a strict subset of the plurality of third entities; tracking a third plurality of interactions with the management computer system that are performed by each of the plurality of third accounts; storing third interaction data defining the one or more aspects of interaction with the management computer system performed by each of a plurality of third accounts; in response to receiving the request, determining that the plurality of third entities perform comparable transactions to the first entity; computing a total transaction metric for the plurality of third entities; for each of the plurality of third entities, identifying a percentage of total transaction metric which corresponds to the entity; determining that the plurality of second entities comprise percentages of the total transaction metric greater than a stored threshold value and, in response, selecting the plurality of second entities for comparing to the first entity.

Structural Overview

FIG. 1 is a block diagram of an example computer network system in which various embodiments may be practiced. FIG. 1 is shown in simplified, schematic format for purposes of illustrating a clear example and other embodiments may include other elements.

In an embodiment, a networked computer system 100 comprises a server computer ("server" for short) 102, first entity computers 122 and 124, second entity computers 126 and 128, and third entity computers 130 and 132, which are communicatively coupled directly or indirectly via network 140. The server 100, entity computers 122, 124, 126, 128, 130, and 132, and other elements of the system may each comprise an interface compatible with the network 140 and are programmed or configured to use standardized protocols for communication across the networks such as TCP/IP, Bluetooth, and higher-layer protocols such as HTTP, TLS, and the like.

Server computer 102 may be implemented using a server-class computer or other computers having one or more processor cores, co-processors, or other computers. Server 102 may be a physical server computer and/or a virtual server instance stored in a data center, such as through cloud computing. While a single server computer 102 is depicted in FIG. 1, in some embodiments, server computer 102 comprises a plurality of server computers.

In an embodiment, the server computer 102 executes metric computation instructions 116, recommendation generation instructions 118, and entity aggregation instructions. The server 102 may also be executing additional code, such as code for a procurement system 112. Although the metric computation instructions 116, recommendation generation instructions 118, and entity aggregation instructions 120. are shown in FIG. 1 as executing on the server 102 separately from the procurement system 112, the metric computation instructions 116, recommendation generation instructions 118, and entity aggregation instructions 120 may be a part of computer instructions installed as part of the procurement system 112, as a module or a plug-in to supplement features of the procurement system 112, as a separate instance of executing code on the server 102, an instance of code of the procurement system 112, or any other arrangement depending on the needs of a buyer entity.

The server 102 may generate and transmit alerts, notifications, recommendations and other information generated by the metric computation instructions 116, recommendation generation instructions 118, and entity aggregation instructions 120 to the first entity computers 122, 124, second entity computers 126, 128 and/or third entity computers 130, 132 over the network 132 via the presentation layer 120.

The procurement system 112 may include a transactional database 114 managed by the procurement system 112. The transactional database 114 may include transactional information on one or more supplier entities as well as associated details on the supplier entities. The transactional database 114 may also include, for each supplier entity, one or more records of orders or transactions between the supplier entity and a respective buyer entity.

Although the transactional database is shown in FIG. 1 as encompassed by the procurement system 112, the transactional database 114 may exist separately from the procurement system 112 and/or server 102, and may be accessed via network 132.

Additional computing elements, code or other functional elements that are not shown in FIG. 1 may be provided by the procurement system 112.

The server 102 stores data defining entity profiles 104. For example, the server 102 may store authentication data and other tracked data, such as transaction history, catalogs, and user preferences, for users of procurement system 112. Entity profiles 104 may comprise data defining a plurality of entities. Each of a plurality of entities may comprise a plurality of entity accounts. For instance, the first entity in FIG. 1 comprises a plurality of first entity accounts. The plurality of first entity accounts may be associated with different users, each of which is associated with the first entity. For instance, the first entity may comprise a business with the first entity accounts being associated with individual employees of the business.

The server 102 is accessible over a network 140 by multiple computing devices, such as the first entity computers 122, 124, second entity computers 126, 128 and/or third entity computers 130, 132. Although there are two computers depicted for each entity in FIG. 1, any other computers may be registered with the server 102 at any given time. Thus, the elements in FIG. 1 are intended to represent one workable embodiment but are not intended to constrain or limit the number of elements that could be used in other embodiments. In an embodiment, the first entity computers 122 and 124 may be restricted to only users from a single entity. In other words, although more than one computer may be used, only verified users of a single entity may access information stored in the procurement system 112 from these computers. Any applicable means of restricting unauthorized users from accessing the procurement system 112 may be used (for example, password and username, two-step authentication, or other means). Further, each of the second entity computers 126 and 128 may correspond to one or more second entities and each of the third entity computers 130 and 132 may correspond to one or more third entities.

The computing devices such as the first entity computers 122, 124, second entity computers 126, 128 and/or third entity computers 130, 132 may comprise computers that include hardware capable of communicatively coupling the computers to one or more server computers, such as server computer 102 over one or more service providers. For example, first entity computers 122, 124, second entity computers 126, 128 and/or third entity computers 130, 132 may include a network card that communicates with server computer 102 through home or office wireless routers (not illustrated in FIG. 1) coupled to an internet service provider. The first entity computers 122, 124, second entity computers 126, 128 and/or third entity computers 130, 132 may be any of smart phones, personal computers, tablet computing devices, PDAs, laptops, or any other computing devices capable of transmitting and receiving information and performing the functions described herein.

The presentation layer 110 may be programmed or configured for generating electronic pages, alerts, notifications, hyperlinks, recommendations, or application protocol messages to output to the computing devices such as the first entity computers 122, 124, second entity computers 126, 128 and/or third entity computers 130, 132. For example, the presentation layer 104 may be programmed to generate dynamic web pages that implement an application as a software-as-a-service (SaaS) application that the first entity computers 122, 124, second entity computers 126, 128 and/or third entity computers 130, 132 accesses using a web browser hosted at the computing device.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server 102.

Metric computation instructions 116 comprise computer readable instructions which, when executed by one or more processors of server 102, cause server 102 to compute metrics for one or more entities based on tracked transaction data. Server 102 may compute metrics periodically, such as once a week, and/or in response to one or more actions, such as a request for a metric comparison from an entity computer.

Recommendation generation instructions 118 comprise computer readable instructions which, when executed by one or more processors of server 102, cause server 102 to generate one or more recommendations for an entity based on one or more computed metrics. Entity recommendations may be generated periodically and/or in response to one or more actions, such as a request for a metric comparison from an entity computer.

Entity aggregation instructions 120 comprise computer readable instructions which, when executed by one or more processors of server 102, cause server 102 to aggregate data from a plurality of entities for the purpose of generating one or more average metrics for the plurality of entities. Entity aggregation instructions 120, when executed, may further cause server 102 to identify specific entities for the purpose of aggregation, such as entities that are similar to a requesting entity.

Network 140 may be implemented by any medium or mechanism that provides for the exchange of data between the various elements of FIG. 1. Examples of network 140 include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. For purposes of illustrating a clear example, network 140 is shown as a single element but in practice, network 140 may comprise one or more local area networks, wide area networks, and/or internetworks. The various elements of FIG. 1 may also have direct (wired or wireless) communications links, depending upon a particular implementation.

Functional Overview

Figure 2:
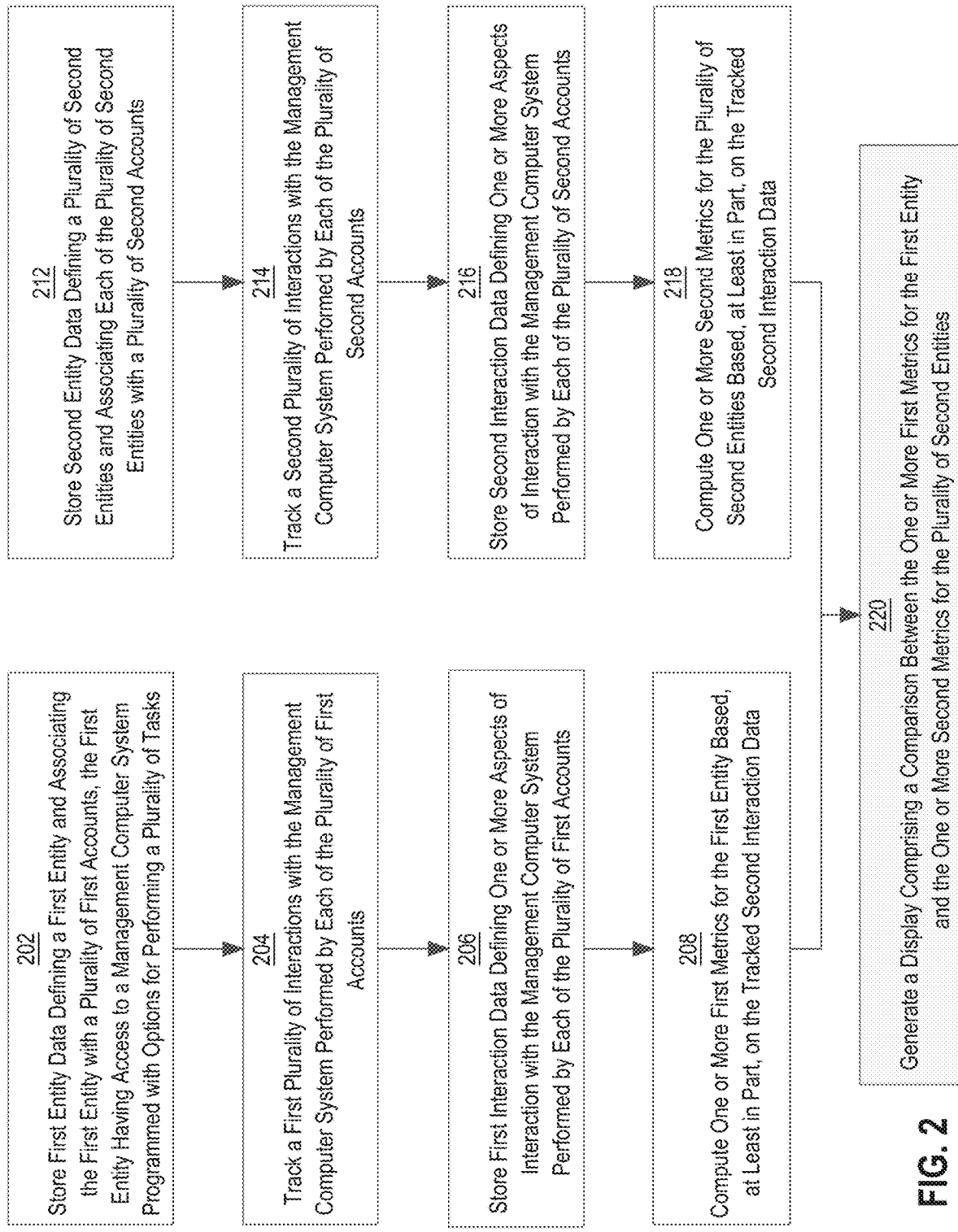
FIG. 2 is a flow diagram depicting an example method for tracking interactions with a server computer system and generating displays and/or recommendations based on the interactions.

FIG. 2 is a flow diagram depicting an example method for tracking interactions with a server computer system and generating displays and/or recommendations based on the interactions.

At step 202, first entity data defining a first entity and associating the first entity with a plurality of first accounts is stored. For example, a management computer system may store an entity profile that identifies an entity which has access to software provided by the management computer system, such as a software-as-a-service (SaaS) application. The first entity may be an organizational grouping which includes a plurality of individual accounts. For example, an entity may refer to a business with individual employees of the business maintaining individual accounts. Thus, while the management computer system maintains a plurality of first accounts, the plurality of first accounts comprise accounts that belong to the first entity.

In an embodiment, the first entity has access to a management computer system programmed with options for performing a plurality of tasks. For example, the SaaS application provided by the management computer system may include options for performing various tasks. The various tasks may include approval tasks, such as approving expense reports, sourcing tasks, such as transactions between different computing devices, reviewing tasks, such as reviewing contracts or other documents, and/or document generation tasks, such as generation of expense reports. The above listed tasks are intended as examples and the plurality of tasks may differ depending on the type of options presented by the management computer system. For example, in the procurement context, a sourcing task may include a request from one entity for one of a plurality of entities to provide a good or service. For example, in the procurement context, a sourcing task may include a request from one entity for one of a plurality of entities to provide a good or service.

At step 204, a first plurality of interactions with the management computer system performed by each of the plurality of first accounts is tracked by the management computer system. For example, when the management computer system receives a message from a client computing device, such as a request to generate a new form or review a document for approval, the management computer system may identify a user profile and entity associated with the request. The management computer system may then store data identifying the type of message received, the user profile, and the entity. Thus, if a user accesses a software platform provided by the management computer system, generates an expense report, and stores the expense report, the management computer system may store additional entity data for the entity associated with the user indicating that the user accessed the software platform, generated an expense report, and stored the expense report.

At step 206, first interaction data defining one or more aspects of interaction with the management computer system performed by each of the plurality of first accounts is stored. For example, the management computer system may store interaction data for a particular entity over a particular period of time. The interaction data may include aggregated information regarding interactions performed by computing devices associated with the entity, such as through a user profile identifying the entity. As an example, the management computer system may store data identifying expense reports created in a week, month, year, and/or total.

At step 208, one or more first metrics for the first entity are computed based, at least in part, on the tracked transaction data. The metrics may include aggregated totals, averages, averages for particular time periods, ratios, and/or scores. For example, the management computer system may generate a first metric indicating a number of expense reports submitted, an average amount of time between submission of an expense report and review of the expense report and/or approval of the expense report, a percentage of expense review or approved, and/or other metrics describing the use of a software platform provided by the management computer system. Examples of generated metrics are provided further herein.

At step 212, second entity data defining a plurality of second entities and associating each of the plurality of second entities with a plurality of second accounts is stored. For example, the management computer system may store entity profiles for a plurality of second entities, each of which identifies an entity which has access to software provided by the management computer system, such as the SaaS application. Each entity profile may include a plurality of user profiles associated with the entity profile.

At step 214, a second plurality of interactions with the management computer system performed by each of the plurality of second accounts is tracked by the management computer system. For example, the management computer system may track interactions with the management computer system for each profile of the plurality of second entities in a similar manner as for the profiles of the first entity.

At step 216, second interaction data defining one or more aspects of interaction with the management computer system performed by each of the plurality of second accounts is stored. For example, the management computer system may store interaction data for each of the plurality of second entities in a similar manner as for the first entity.

At step 218, one or more second metrics for the plurality of second entities are computed based, at least in part, on the tracked transaction data. For example, the management computer system may generate metrics for the plurality of second entities based on the metrics generated for the first entity. The metrics generated for the plurality of second entities may include aggregated metrics and/or individual metrics. For example, if the one or more first metrics include an average number of expense reports in a particular month for the first entity, the management computer system may compute an average number of expense reports per month for each of the plurality of second entities, an average number of expense reports per month across all of the plurality of second entities, an average number of expense reports for the particular month for each of the plurality of second entities, and/or an average number of expense reports for the particular month across all of the plurality of second entities.

At step 220, a display comprising a comparison between the one or more first metrics for the first entity and the one or more second metrics for the plurality of second entities is generated. For example, the management computer system may display a graphic that identifies differences between how the first entity and the plurality of second entities interact with the management computer system, such as a graphical comparison in the average number of expense reports over time.

The management computer system may display the comparison between the one or more first metrics for the first entity and the one or more second metrics for the plurality of second entities in response to a request from a client computing device. For example, a client computing device may send a request to the management computer system requesting a comparison between an entity associated with a user profile of the client computing device and comparable entities. In response, the management computer system may cause display of the display comparing the metric for the first entity with the one or more second metrics for the plurality of second entities.

In an embodiment, the management computer system preprocesses information related to each tracked entity. For example, the management computer system may store data for each entity identifying one or more metrics for the entity, such as average number of expense reports per month, number of active users, number of expense reports submitted, approved, rejected, and/or withdrawn, and/or any other metrics described herein. When the management computer system receives a request to generate a comparison, the management computer system may compute overall and/or average metrics for the plurality of second entities by using the preprocessed information. As an example, if the management computer system tracks a number of expense reports submitted and a number of expense reports rejected for each of a plurality of entities, the management computer system may, in response to a request for a comparison, compute a total percentage of expense reports that are rejected across a plurality of second entities and/or store data for each entity identifying a percentage of expense reports that are rejected for the entity and compute an average rejection rate across the plurality of second entities.

By performing aggregations and computations on the fly, the management computer system is able to generate comparative metrics that do not include the metrics of the first entity. Thus, instead of comparing the first entity to an aggregated total which includes the first entity, the management computer system is able to compare the first entity to an aggregated total of other entities. Additionally or alternatively, by preprocessing information for each entity, but performing aggregations and computations in response to a request, the management computer system is able to select a specific subset of the tracked entities for comparison to the first entity. For example, the management computer system may compare entities of similar business industries based on data stored in the entity profile describing a type of industry for the entity.

In an embodiment, the management computer system performs aggregations based on entity information. For example, each entity profile may identify one or more of an industry of the entity, a location of the entity, a number of employees of an entity, an average revenue of the entity, and/or an average valuation of the entity. The management computer system may generate the comparative metrics based on one or more of the identified values in the entity profile. Thus, the first entity may be compared against entities within a threshold distance of the first entity, within a same region as the first entity, within a threshold valuation of the first entity, with a number of employees within a threshold range of the first entity, and/or with similar revenue as the first entity. Comparative metrics between the first entity and similarly situated entities are made feasible by the initial preprocessing of entity information to create totals, averages, and/or rates for each entity which can then be aggregated into a total and/or average in response to a comparison request.

Additionally or alternatively, the management computer system may select entities to compare to the first entity based on a request from the client computing device. For example, the management computer system may provide a graphical user interface to the client computing device with an option for requesting a comparison of one or more of a plurality of metrics across entities with one or more of a plurality of features. The client computing device may identify a specific metric for comparison as well as one or more specific features of entities for comparison. For example, the graphical user interface may include options for designating a region, company size, revenue, and/or a number of employees. A user of the client computing device may select revenue and input one or more values indicating a minimum, maximum, or range of revenues. When the client computing device sends the request the management computer system, the request may include the designations made by the user. Thus, if the user requests comparisons between an entity associated with the user profile and entities with a previous year's revenue of over $10,000,000, the management computing device may identify each entity with a previous year's revenue of over $10,000,000 and generate the second metrics using the identified entities.

The rules for selecting entities may also be based on preidentified categorical distinctions. For example, the management computer system may identify an entity with fifty or less employees as a "small entity" and an entity with over five hundred employees as a "large entity." The management computer system may compare entities within similar categories and/or may provide options for comparisons based on categories. Thus, instead of the graphical user interface including options for selecting a range, the graphical user interface may include options for selecting a category. In another embodiment, the graphical user interface utilizes both categories and input values, thereby allowing the client computing device to send data identifying a category for comparison or send data identifying a range of values for comparison.

Tracked Interactions and Generated Metrics

In an embodiment, the management computer system tracks specific types of interactions with the system in order to generate metrics related to interactions with the system. The metrics may include data on the frequency of transaction types and/or metrics regarding details of the transactions. Metrics may be computed for specific periods of time, such as weekly, month, or yearly metrics, and/or generally, such as metrics identifying a greatest number of active users at any given time. For example, a number of active users may be determined for each month of a year. Example computed metrics for a management computer system may include one or more of the following:

- Number of expense reports submitted
- Number of expense reports approved
- Number of expense reports rejected
- Number of expense reports withdrawn
- Number of users associated with the entity
- Number of active users
- Average number of reports generated per user
- Total expense amount submitted through expense reports
- Total expense amount approved through expense reports
- Largest total expense amount from an expense report
- Average number of expense lines per expense report
- Average expense amount of expense lines in expense reports
- Largest expense amount of an expense line in expense reports
- Percentage of expense lines created using a credit card
- Average length of travel from a travel line
- Top selected categories for expenses
- Top custom categories for expenses
- Top identified merchants
- Percentage of transactions accompanied by a receipt file
- File types of files uploaded to the management computer system
- Average distance for mileage reimbursement
- Top traveled city
- Top travelled state
- Top currencies used
- Top non-native currencies used
- Comparisons between different years of expense metrics
- Comparisons between different months of expense metrics The above list of metrics includes a non-exhaustive list of examples related to an application platform for generating, reviewing, and approving expense reports. Other types of metrics of management computer system interaction may include other interactions with a software platform and/or transactions between multiple client computing devices for which the management computer system is a facilitator.

In an embodiment, the management computer system generates direct comparisons between the metrics of the first entity and aggregated metrics of the plurality of second entities to which the first entity is being compared. For example, the management computer system may compute the average cost of approved expense reports for the first entity. The management computer system may then aggregate costs of approved expense reports for the plurality of second entities and generate an aggregated average cost of approved expense reports for the plurality of second entities.

In an embodiment, the management computer system weights metrics differently for the plurality of second entities. For example, the management computer system may track sales of products from each of a plurality of vendor entities. When a particular vendor entity requests a comparison between metrics for the particular vendor entity and a plurality of other vendor entities, the management computer system may generate the metric for the plurality of other vendor entities as an average weighted by percentage of the total amount of a product type sold, either linearly or mapped to a metric-specific distribution function. For example, if the particular vendor entity is a seller of cellular phones, the management computer system may weight the plurality of second entities based on a number of cellular phones sold by each entity. Thus, metrics from an entity that has sold three thousand cellular phones since the beginning of the year may be weighted three times as much as metrics from an entity that has only sold one thousand cellular phones since the beginning of the year.

By preprocessing the metrics data, the management computer system is able to generate comparisons relevant to a particular entity without performing a large number of initial calculations or storing a large amount of data. For instance, the preprocessing of metrics data allows an individual entity to be compared to specific entities which are weighted based on the individual entity. For instance, in a first entity's comparison, a second entity may have a first weight due to sales of cellular phones, but in a third entity's comparison, the second entity may have a different weight due to sales of laptops. Additionally, the weights may change due to comparative groups excluding the entity that is being compared to the group.

Recommendation Actions

In an embodiment, the management computer system uses the metric comparisons to generate recommendations. The management computer system may determine whether to issue a recommendation based on differences between the metrics of the first entity and the plurality of second entities. For example, if the management computer system determines that the difference between the number or percentage of expense reports reviewed over the past month for the first entity and the plurality of second entities exceeds a threshold value or percentage, the management computer system may generate a recommendation to review additional expense reports.

In an embodiment the management computer system selects the plurality of second entities based on one or more rules in order to increase the value of recommendations. For example, the management computer system may select entities within the same business as the first entity which have the top ten revenues of the entities in the same business. Thus, the rules for selecting entities to compare to the first entity may be based on similarities between the first entity and the selected entities, such as similarities in company size or business type, and/or based on top and/or threshold values, such as top revenue or revenue above a certain level. Additionally, the management computer system may select entities for comparison based on the type of metric. For example, if the metric for comparison is "Number of expense reports reviewed," then the management computer system may select second entities that have a similar number of expense reports generated, such as within a range of 80%-120% of the expense reports generated by the first entity.

In an embodiment, the management computer system generates recommendations to perform specific interactions with the management computer system. For example, if a number of expense reports reviewed by the first entity is below the average number of expense reports reviewed by the plurality of second entities, the management computer system may generate a recommendation to review one or more expense reports.

In an embodiment, the recommendations may include hyperlinks which, when selected, causes a client computing device to navigate to a display for performing the recommended action, such as an application interface and/or a webpage. As an example, the recommendation to review additional expense reports may include a hyperlink that, when selected, causes the client computing device to display a webpage and/or application interface which includes one or more expense reports that have not been reviewed. Thus, the management computer system generates functionality that allows the client computing device to respond to metric comparisons by immediately performing recommended actions.

In an embodiment, the management computer system stores hyperlinks to different pages and/or interfaces. The management computer system may also store data identifying one or more recommendation types and the corresponding hyperlinks. When the management computer system determines that a recommendation is to be sent to the client computing device based on the tracked metrics, the management computer system may generate the recommendation along with the hyperlink. Additionally or alternatively, the management computer system may generate a hyperlink that is specific to the entity, thereby allowing the management computer system to create functionality for an entity that is based on that entities deployment of management software.

Visual Comparisons

In an embodiment, the management computer system generates a display on a client computing device comparing metrics between the first entity and the plurality of second entities. The display may compare changes in metrics over time, such as by displaying comparisons between the first entity and the plurality of second entities at different points in time. In an embodiment, the management computer system updates the display when the client computing device requests a change in one or more parameters, such as the entities to be compared to the first entity, the time period of comparison and/or the metrics for comparison.

Figure 3:
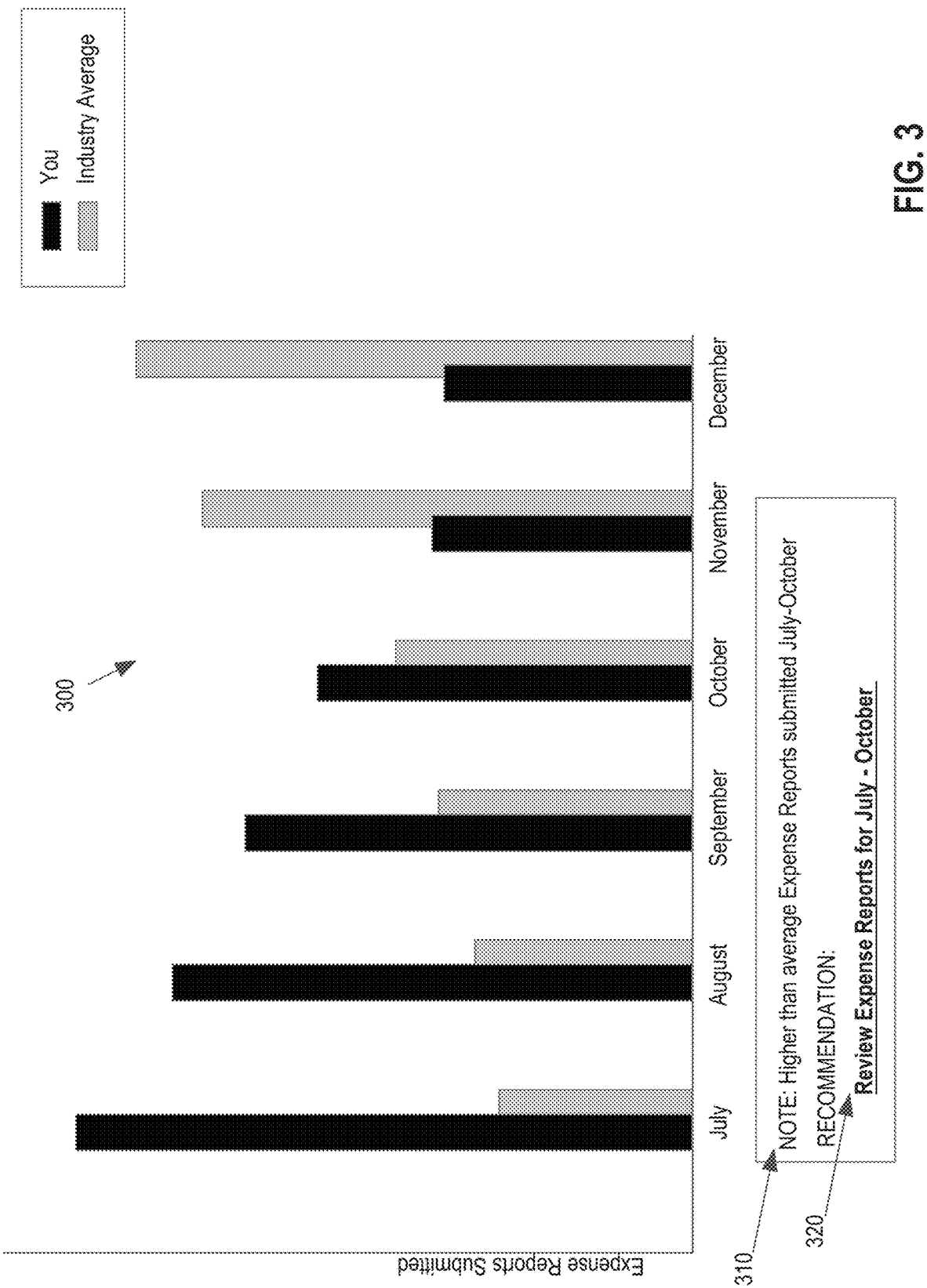
FIG. 3 depicts an example interface displaying a comparison between metrics for a first entity and a plurality of second entities.

FIG. 3 depicts an example interface displaying a comparison between metrics for a first entity and a plurality of second entities. The display of FIG. 3 includes an expense report histogram 300 indicating a comparison in number of expense reports submitted by month. The histogram 300 compares the entity associated with the viewing computing device with a plurality of other entities by depicting the expense reports submitted for the first entity juxtaposed with the average number of expense reports submitted by the plurality of second entities for each month.

FIG. 3 additionally includes a notification 310 identifying discrepancies between the first entity and the plurality of second entities. In FIG. 3, the number of expense reports submitted for July-October for the first entity were higher than the average expense reports submitted for those months. The management computer system stores a rule indicating that if the number of expense reports submitted by the first entity are greater than the average for at least a threshold period of time, such as a month, the management computer system is to generate the notification 310 and a recommendation 320. Thus, the display includes a notification of the difference in metrics as well as the recommendation to review expense reports for the period of time in question. The recommendation 320 may include a hyperlink which, when selected causes the computing system to display an interface for reviewing the expense reports in question.

In an embodiment, an interface comprises a plurality of comparisons between the metrics for the first entity and metrics for the plurality of second entities. For example, the management computer system may generate a plurality of graphics, charts, and or other visual comparisons based on different metrics and display them on the client computing device, thereby allowing for review and action based on a plurality of different metrics.

In an embodiment, the interface additionally includes metrics for a particular entity of the plurality of second entities. For example, the management computer system may identify a leading entity based on highest revenue, highest sales in a particular market, and/or one or more other factors. The management computer system may generate a display that includes a comparison between the first entity, the plurality of second entities, and the identified leading entity, such as the histogram in FIG. 3, but with an extra bar for the leading entity. The identity of the leading entity may be replaced with a title, such as "industry leader." In embodiments, the leading entity may comprise an average of a plurality of entities. Leading entities may also be metric-specific. For example, one entity may be considered a leading entity based on revenue while another entity may be considered a leading entity based on size.

Benefits of Certain Embodiments

The techniques described herein improve the ability of a management computer system to track interactions with the management computer system and display information regarding those interactions to a client computing device. By preprocessing data for each entity, such as by storing running totals, averages, and other metrics for each entity, the management computer system is able to generate comparisons for an individual entity as an immediate response to a request using less computing power than would be required to generate the metrics without performing the preprocessing. The methods described herein improve allow the management computer system to generate comparisons that are specific to a requesting entity, such as by not including the requesting entity in the group to which the requesting entity is being compared, selecting relevant second entities based on industry, company size, or revenue, and/or generating recommendations specific to how users of the requesting entity are engaging with a provided platform.

The methods described herein additionally create new types of comparison data that enable the management computer system to do things it was unable to do prior. By generating comparisons between metrics based on interactions with the management computer system, the management computer system is able to determine shortcomings in the manner in which an entity uses the system. Thus, if users of an entity are under-utilizing a specific feature of a provided software platform, the comparison metrics between the first entity and the plurality of second entities allows the computing system to identify the feature that is being under-utilized and send data to the first entity that allows the first entity to remedy the under-utilization.

The methods described herein additionally increase the amount of information available to a system administrator through a graphical user interface. While system administrators are usually responsible for facilitating deployment of a software platform, the system administrators are generally blind to how the users of a specific deployment are interacting with the software platform. This lack of information decreases the usability of the software platform because the system administrator is unable to identify which features are being used and which features are not being used. Additionally, without information as to how other entities utilize the software platform, the system administrator is unable to determine whether the usage of the platform features is unusual. The methods described herein allow the management computer system to identify and display information regarding the platform usage through a graphical user interface, thereby allowing a system administrator to monitor platform usage and compare the platform usage to the general industry usage.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
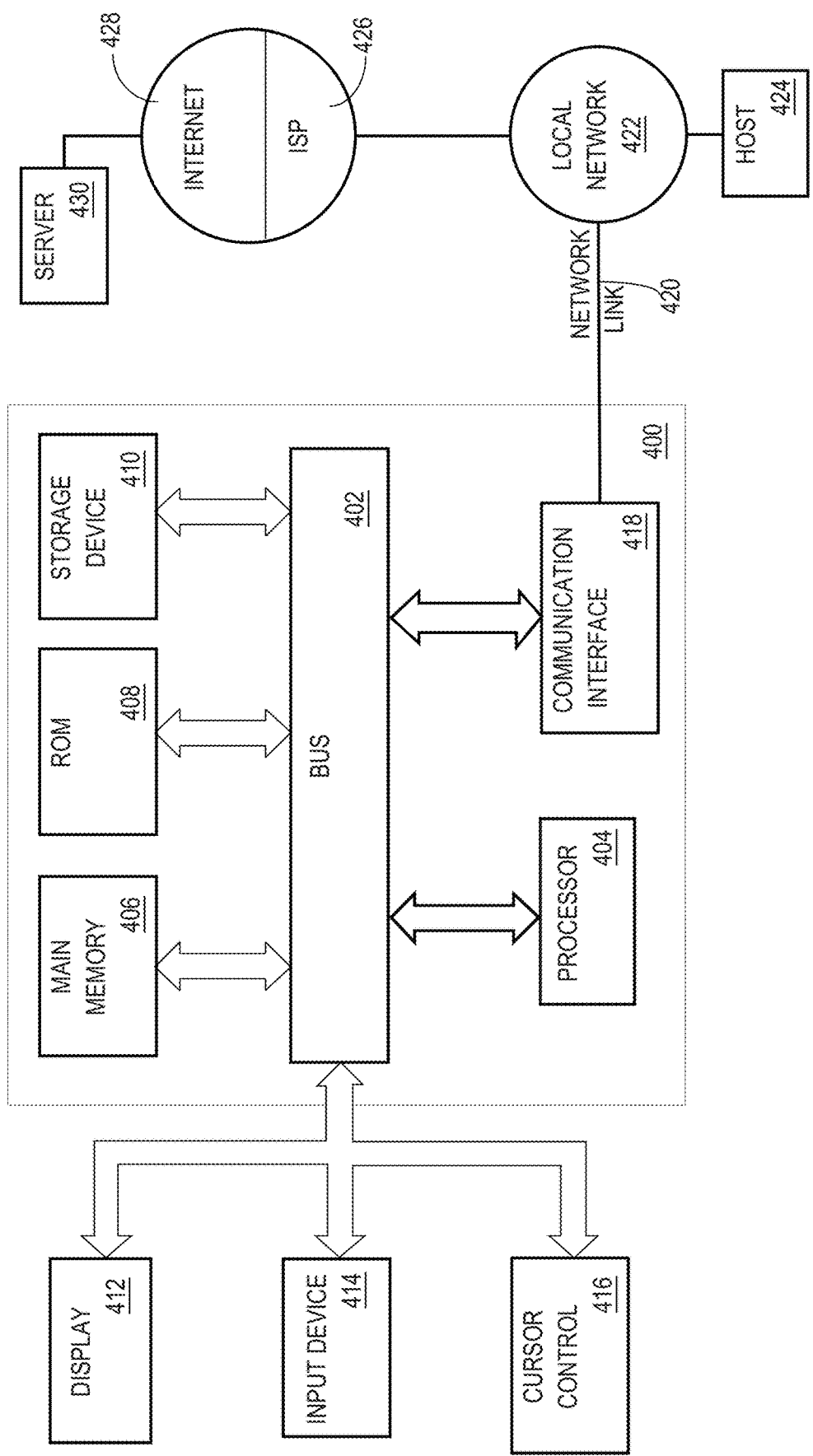
FIG. 4 is a block diagram that illustrates an example computer system with which an embodiment may be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM, and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A method comprising:
   using a management computer system, storing first entity data defining a first entity and associating the first entity with a plurality of first accounts, the first entity having access to the management computer system programmed which provides options for performing a plurality of tasks;
   tracking a first plurality of interactions with the management computer system that are performed by each of the plurality of first accounts;
   storing first interaction data defining one or more aspects of interaction with the management computer system that are performed by each of the plurality of first accounts;
   storing second entity data defining a plurality of second entities and associating each of the plurality of second entities with a plurality of second accounts;
   tracking a second plurality of interactions with the management computer system that are performed by each of the plurality of second accounts;
   storing second interaction data defining the one or more aspects of interaction with the management computer system performed by each of the plurality of second accounts;
   identifying, from the second interaction data, a plurality of third entities by determining that the plurality of third entities are similar to the first entity, the plurality of third entities comprising a strict subset of the plurality of second entities;
   computing one or more first metrics for the first entity based, at least in part, on the tracked first interaction data;
   computing, for each of the plurality of third entities, a total transaction value comprising a total of all transaction values corresponding to a particular type of transaction within a particular period of time;
   computing one or more second metrics for each the plurality of third entities based, at least in part, on the tracked second interaction data;
   generating an aggregated metric comprising a weighted average of the one or more second metrics, wherein the weighted average is weighted for each of the plurality of third entities based on the total transaction value;

generating a display comprising a comparison between the one or more first metrics for the first entity and the one or more second metrics for the plurality of third entities;

determining that a difference between the aggregated metric and the one or more first metrics over a second period of time exceeds a threshold value and, in response, generating and displaying, based on the one or more first metrics, a recommendation to perform a specific interaction with the management computer system, wherein the recommendation comprises a hyperlink which, when selected, causes navigation to a display for performing the specific interaction.

2. The method of claim 1, further comprising:

receiving a selection of the recommendation to perform the specific interaction;

in response to receiving the selection, navigating to the display for performing the specific interaction.

3. The method of claim 1, further comprising:

receiving a request from a client computing device associated with the first entity for a dynamic display comprising the comparison between the one or more first metrics for the first entity and the one or more second metrics for the plurality of second entities;

in response to receiving the request, performing the identifying of the plurality of third entities and computing of the one or more second metrics for the plurality of third entities.

4. The method of claim 3, wherein determining that the plurality of third entities are similar to the first entity comprises determining that:

the plurality of third entities are within a threshold distance of the first entity;

the plurality of third entities are within a same region as the first entity;

the plurality of third entities are within a threshold valuation of the first entity;

that a number of employees at each of the plurality of third entities are within a threshold range of a number of employees at the first entity;

that a revenue of the plurality of third entities is within a threshold range of the first entity; or the plurality of third entities have a same predefined category as the first entity.

5. The method of claim 1, wherein the particular type of transaction comprises a particular type of product sold.

6. The method of claim 1, wherein the dynamic display comprises superimposed bar graphs, a first bar graph identifying the one or more first metrics for the first entity and a second bar graph identifying one or more second metrics for the second entity.

7. The method of claim 1, wherein determining that the plurality of third entities correspond are similar to the first entity comprises:

for each of the plurality of third entities, identifying a percentage of total transaction metric which corresponds to the entity;

determining that the plurality of third entities comprise percentages of the total transaction metric greater than a stored threshold value and, in response, selecting the plurality of third entities for comparing to the first entity.

8. A management computer system comprising:

one or more processors;

a memory storing instructions which, when executed by the one or more processors, causes performance of:

storing first entity data defining a first entity and associating the first entity with a plurality of first accounts, the first entity having access to the management computer system programmed with options for performing a plurality of tasks;

tracking a first plurality of interactions with the management computer system that are performed by each of the plurality of first accounts;

storing first interaction data defining one or more aspects of interaction with the management computer system that are performed by each of the plurality of first accounts;

storing second entity data defining a plurality of second entities and associating each of the plurality of second entities with a plurality of second accounts;

tracking a second plurality of interactions with the management computer system that are performed by each of the plurality of second accounts;

storing second interaction data defining the one or more aspects of interaction with the management computer system performed by each of the plurality of second accounts;

identifying, from the second interaction data, a plurality of third entities by determining that the plurality of third entities are similar to the first entity, the plurality of third entities comprising a strict subset of the plurality of second entities;

computing one or more first metrics for the first entity based, at least in part, on the tracked first interaction data;

computing, for each of the plurality of third entities, a total transaction value comprising a total of all transaction values corresponding to a particular type of transaction within a particular period of time;

computing one or more second metrics for each the plurality of third entities based, at least in part, on the tracked second interaction data;

generating an aggregated metric comprising a weighted average of the one or more second metrics, wherein the weighted average is weighted for each of the plurality of third entities based on the total transaction value;

generating a display comprising a comparison between the one or more first metrics for the first entity and the one or more second metrics for the plurality of third entities;

determining that a difference between the aggregated metric and the one or more first metrics over a second period of time exceeds a threshold value and, in response, generating and displaying, based on the one or more first metrics, a recommendation to perform a specific interaction with the management computer system, wherein the recommendation comprises a hyperlink which, when selected, causes navigation to a display for performing the specific interaction.

9. The management computer system of claim 8, wherein the instructions, when executed by the one or more processors, further cause performance of:

receiving a selection of the recommendation to perform the specific interaction;

in response to receiving the selection, navigating to the display for performing the specific interaction.

10. The management computer system of claim 8, wherein the instructions, when executed by the one or more processors, further cause performance of:

receiving a request from a client computing device associated with the first entity for a dynamic display comprising the comparison between the one or more first metrics for the first entity and the one or more second metrics for the plurality of second entities;

in response to receiving the request, performing the identifying of the plurality of third entities and computing of the one or more second metrics for the plurality of third entities.

11. The management computer system of claim 10, wherein determining that the plurality of third entities are similar to the first entity comprises determining that:

the plurality of third entities are within a threshold distance of the first entity;

the plurality of third entities are within a same region as the first entity;

the plurality of third entities are within a threshold valuation of the first entity;

that a number of employees at each of the plurality of third entities are within a threshold range of a number of employees at the first entity;

that a revenue of the plurality of third entities is within a threshold range of the first entity; or the plurality of third entities have a same predefined category as the first entity.

12. The management computer system of claim 8, wherein the particular type of transaction comprises a particular type of product sold.

13. The management computer system of claim 8, wherein the dynamic display comprises superimposed bar graphs, a first bar graph identifying the one or more first metrics for the first entity and a second bar graph identifying one or more second metrics for the second entity.

14. The management computer system of claim 8, wherein determining that the plurality of third entities correspond are similar to the first entity comprises:

for each of the plurality of third entities, identifying a percentage of total transaction metric which corresponds to the entity;

determining that the plurality of third entities comprise percentages of the total transaction metric greater than a stored threshold value and, in response, selecting the plurality of third entities for comparing to the first entity.

* * * * *